May 15, 1923.  
H. Z. COBB  
1,455,240  
HOLLOW ARTICLE OF RUBBER OR LIKE MATERIAL AND PROCESS AND APPARATUS FOR MAKING SAME  
Filed May 2, 1922 2 Sheets-Sheet 1
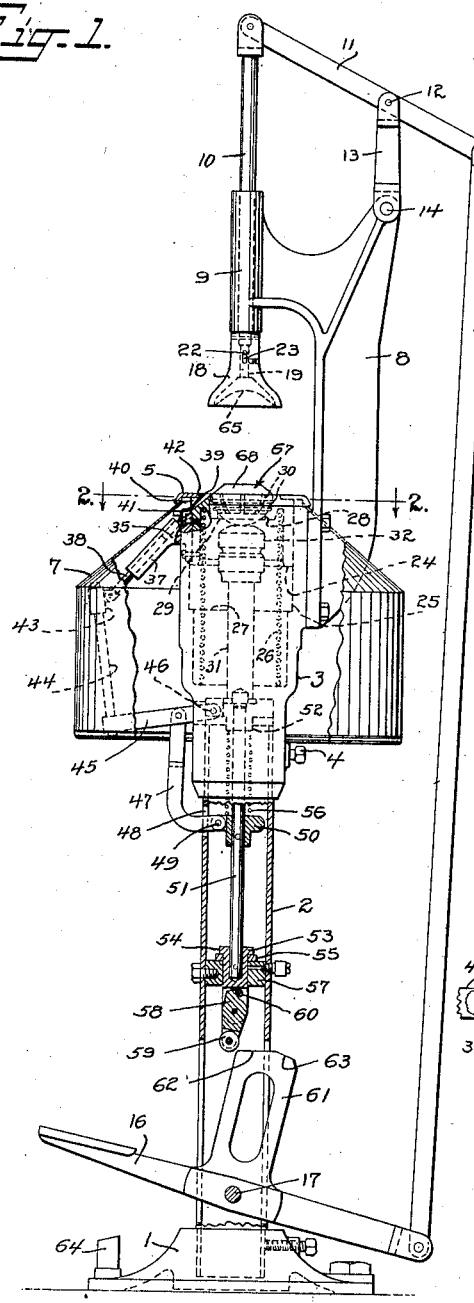
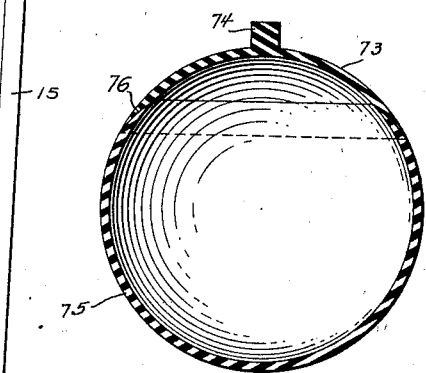
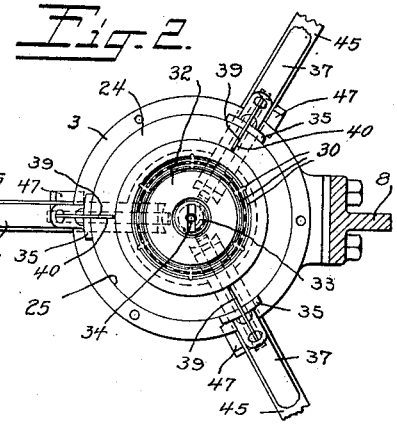
Inventor.
Henry Z. Cobb,
By his Attorney,
Ernest Hopkinson May 15, 1923.
H. Z. COBB
1,455,240
HOLLOW ARTICLE OF RUBBER OR LIKE MATERIAL AND PROCESS AND
APPARATUS FOR MAKING SAME
Filed May 2, 1922    2 Sheets-Sheet 2
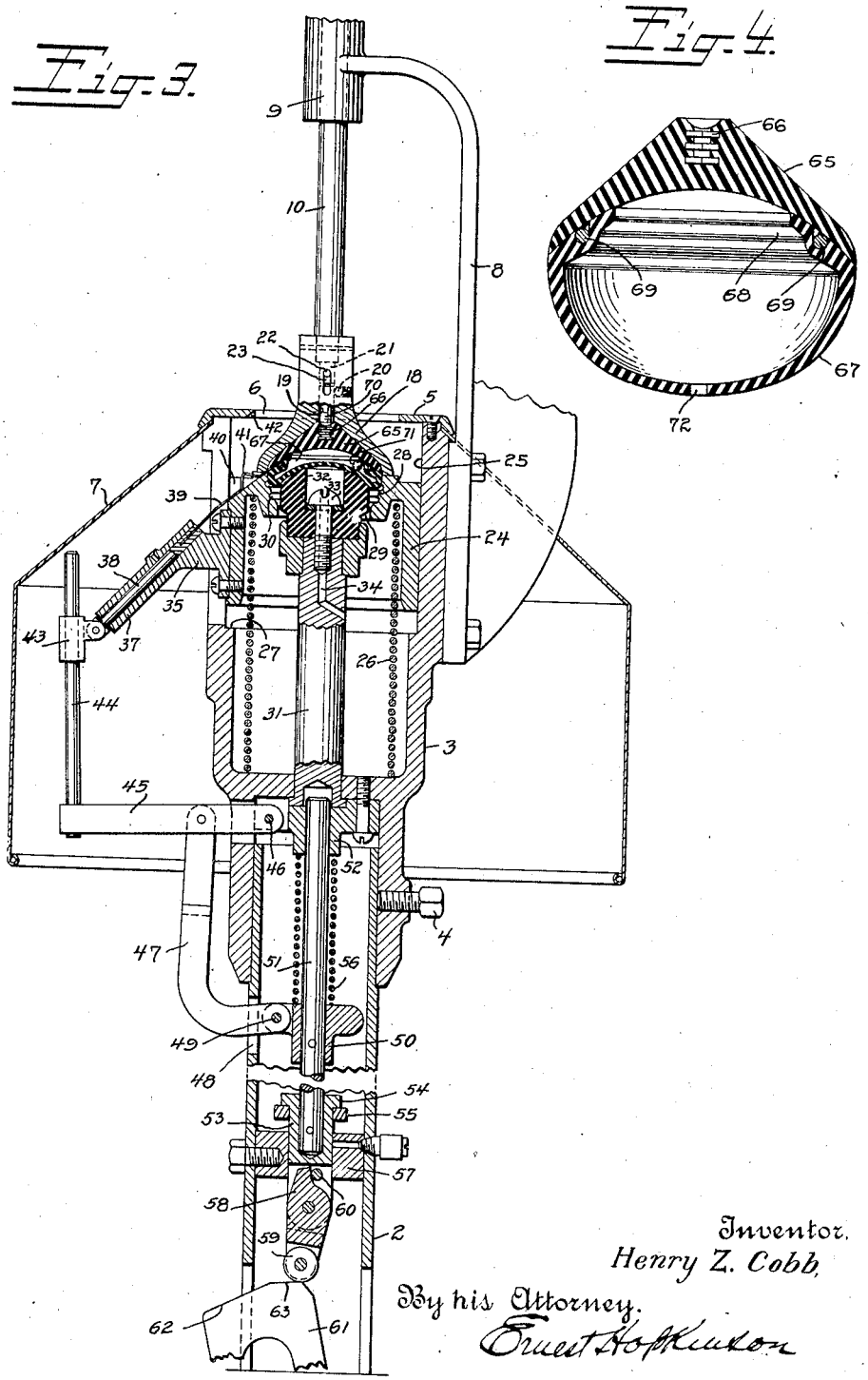
Inventor.
Henry Z. Cobb,
By his Attorney.
Ernest Hopkinson Patented May 15, 1923.

1,455,240

UNITED STATES PATENT OFFICE.

HENRY Z. COBB, OF NEW YORK, N. Y., ASSIGNOR TO THE MECHANICAL RUBBER COMPANY, A CORPORATION OF NEW JERSEY.

HOLLOW ARTICLE OF RUBBER OR LIKE MATERIAL AND PROCESS AND APPARATUS FOR MAKING SAME.

Application filed May 2, 1922. Serial No. 557,924.

*To all whom it may concern:*

Be it known that I, HENRY Z. COBB, a citizen of the United States, residing at New York, in the county of New York and State of New York, have invented a certain new and useful Hollow Article of Rubber or Like Material and Process and Apparatus for Making Same, of which the following is a full, clear, and exact description.

This invention relates to a hollow article of rubber or like material and the process and apparatus for making the same, more particularly to hollow balls, such as tank balls and tennis balls, and the process and apparatus for making them.

Many attempts have been made to make satisfactory tank balls of rubber or similar material, but owing to the conditions under which they are used great difficulty has been found, up to the present time, in making a tank ball which will successfully stand up under the hard usage to which it is put. The ball in use is constantly exposed to water, which tends to soften it, and the lower or valve portion of the ball is desirably made of a soft rubber compound in order that it may accurately seat on the outlet. When the ball is withdrawn from its seat the suction of the water places it under considerable strain and tends to elongate it, thereby deforming it at its equatorial portion, which is the point in the ball at which the joint between the sections is usually made. In an attempt to obviate this deformation it has been proposed to make the upper portion of the ball of a harder stock, or of soft stock with a reinforcement of harder rubber, but in this type of ball great difficulty has been encountered in obtaining a good joint between the different stocks, and the balls frequently break apart at the joint. In addition, a large number of operations are required in making balls of this type, and the equipment is necessarily increased when using different stocks. In another type of ball both the upper and lower sections are made of soft stock and a metallic or other reinforcement is disposed in the interior of the ball adjacent its equatorial portion, and connected by a frame to the top of the ball. This form of metallic reinforcement adds considerably to the cost of the ball and also to the difficulty of making it, and is liable to corrode or rust under the action of the water.

Tennis balls and other playing balls are made in sections joined by a butted or short bevel joint at their equatorial portion. It is difficult to secure a good joint between the sections in this manner, owing to the small area of contact, and in the case of a butted joint a bulge is formed on the interior which unbalances the ball. When a bevel joint is used at the equatorial portion pressure cannot be readily applied normal to the joint or on both sides thereof.

The present invention comprises briefly a ball formed throughout of the same soft stock, vulcanized to the same extent, the sections or segments of which are joined on a long overlapping joint under pressure, and in the case of a tank ball having a reinforcement entirely imbedded in the wall of the ball; and it also comprises the process and apparatus utilized in making the ball.

An object of my invention is to provide an improved all-soft rubber tank ball or similar article.

Another object is to provide a ball or other hollow article of vulcanizable material which is not liable to open at the joint.

Still another object is to provide a ball in which the sections are formed with relatively extended joining surfaces so disposed that pressure may be readily applied in a plane normal to the joint and from both sides thereof.

Still another object is to provide an improved reinforcement for a soft rubber tank ball.

A further object is to provide an improved process and apparatus for economically and simply making tank balls, tennis balls and similar articles.

Still another object is to provide an improved process and apparatus for joining the sections of hollow articles such as tank balls, tennis balls and similar devices.

For a complete disclosure of the invention reference is had to the accompanying specification and drawings, in which latter:

Fig. 1 represents in side elevation an apparatus for joining the sections or segments of my improved ball;

Fig. 2 is a section on the line 2—2 of Fig. 1, partly broken away.

Fig. 3 is an enlarged vertical sectional view of Fig. 1;

Fig. 4 is a section of a completed tank ball; and

Fig. 5 is a section of a playing or tennis ball showing the application of my invention.

The apparatus shown in the present embodiment is adapted for use in making tank balls and comprises means for joining the sections including a base 1 from which extends upwardly a hollow column 2, to which latter is secured a tubular frame 3 by means of the set screw 4. A top 5, provided with a central opening 6 is secured to the upper end of the frame 3, and depending from the top is a casing or guard 7. Secured to the side of the frame 3 is an upwardly extending bracket 8 provided at its upper end with the bearing sleeve 9 in which is reciprocable a rod 10. The upper end of the rod is pivotally connected to a lever 11, which latter is pivotally mounted at 12 on a link 13 pivoted to the bracket 8 at 14. A connecting rod 15 is pivotally connected at one end to the other end of the lever 11, and at its lower end to an operating lever 16 pivotally mounted in the column 2 at 17, which lever 16 in the present instance is shown as foot-operated. Secured to the lower end of the rod 10 is a holder 18 for one section or segment of the ball to be made. In the present embodiment the apparatus is designed for joining the sections of a tank ball having a substantially conical upper part, and the recess in the holder 18 is therefore formed of a similar shape. At the upper end of the recess is a bore 19 into which is adapted to slightly project a spring-pressed detent 20, and above the detent a small ejecting plunger 21 is movable in the bore, which plunger may be actuated by means of the opposed fingers 22 extending through slots 23 in the holder 18.

The holder for the other section or segment of the ball comprises a cylinder or piston 24 mounted to reciprocate in a counter-bore 25 formed in the tubular frame 3, which piston is normally held in an upper position against the top 5 by the coil spring 26, and downward movement of the holder is limited by the shoulder 27 at the bottom of the counter-bore. The head of the holder or piston is formed with a recess 28 shaped to fit the ball section which it is designed to hold and at the bottom of the recess an opening 29 is formed in the head. The wall of the recess is provided with horizontally and vertically extending grooves 30 for a purpose to be later described. Fixedly mounted axially of the frame 3 is a column 31 to the upper end of which is secured a collapsing device, formed as a rounded head 32 of rubber or similar material, by means of the screw 33. This screw 33 as shown in Fig. 3, is disposed at the bottom of a recess in the head 32, and a small duct 34, leads downwardly through the screw 33 and column 31 to the interior of the frame 3 for a purpose to be later described. The head 32 is of such diameter that it may pass through the opening 29. Secured at intervals around the holder 24 are a series of brackets 35, in the present instance three in number, extending through slots in the frame 3 each of which carries an inclined bearing 37 in which is movable a small plunger 38. Mounted in the upper end of each plunger is a venting and centering needle 39 which in the present instance is shown solid and is made of spring metal. Each needle is adapted to move in a guide groove 40 formed in the holder 24, and some distance back from the free end of each needle it is provided with an angular or bent portion 41, which is adapted to engage the bottom of the small groove 42 formed at the edge of opening 6 in the top 5 for a purpose to be later described. The lower end of each plunger 38 is pivotally connected to a sleeve 43 slidable on a rod 44 carried by a lever 45 pivotally mounted in the frame 3 at 46. A bent link 47 is connected at its upper end to an intermediate point on the lever 45, while its lower end extends through a slot 48 in column 2 and is pivotally connected at 49 to a sleeve 50 pinned to a plunger rod 51. The upper end of the plunger rod is mounted in a bearing 52 and its lower end carries a plunger 53 having an enlarged head 54 below which is disposed a washer 55 of suitable cushioning material. A coil spring 56 is disposed around the rod 51 between the bearing 52 and the sleeve 50 and tends to move the plunger rod 51 and plunger 53 downwardly. The plunger 53 is movable in a bearing member 57 which also acts as a stop when the washer 55 comes in contact therewith. A dog 58 is pivotally mounted in the lower end of the plunger 53 and carries at its lower end a cam roller 59. It will be seen from an inspection of Figs. 1 and 3 that this dog is free to move from the perpendicular in one direction, but movement in the opposite direction is prevented by the stop 60.

A cam 61 extends upwardly from the lever 16 and is provided with the inclined cam surface 62 and dwell 63, over which the cam roller 59 is adapted to move in the operation of the device. A stop 64 is also provided for the lever 16 to prevent strain of the connections after the holder 24 has engaged its stop shoulder 27.

In carrying out the process as applied to a ball having a conical top, the upper section 65 of the ball is made of soft rubber stock substantially in the shape shown in Fig. 4, and having its wall thickened adjacent its upper portion to stiffen the wall and provide an anchorage for the usual metal spud 66. The lower section 67 of the ball is made in the usual rounded form and of the same soft stock as the upper section, and at its upper portion is provided with the relatively long inwardly and upwardly inclined extension 68, in which extension in the present instance is formed a groove adapted to receive a reinforcing ring 69 of metal or other suitable material. The upper and lower sections are then partially cured to the same extent, and the ring 69 inserted in its place in the lower section, while the small metal piece 70, shown in Fig. 3, is temporarily secured in the spud 66 of the upper section. The meeting edges of the sections are cemented, and the upper section is inserted in the holder 18 with the metal piece 70 disposed in the bore 19 where it is frictionally engaged by the detent 20, to hold the section 65 in place in the holder. The lower section 67 is placed in the recess 28 and a small pill 71 of a volatile gas-producing compound inserted in the lower section. The operator then presses down on the lever 16, causing the holder 18 to move downwardly toward the holder 24. At the same time the cam roller 59 moves up on the inclined surface 62 of cam 61, causing the venting and centering needles 39 to be moved inwardly and upwardly, but it will be noted from Fig. 1 that the venting devices 39 are inclined upwardly somewhat away from the surface of the extension 68 on the lower ball section. Shortly before the roller 59 reaches the upper end of the incline 62 the angled portions 41 of the venting devices contact with the bottoms of the respective grooves 42 in the top 5, causing the free ends of the venting and centering devices 39 to be pressed downwardly against the surface of the extension 68 on the lower ball section, and if for any reason the lower ball section has not been properly centered by the operator the pressure of the venting and centering devices 39 will properly align it with the upper section. Just after the roller 59 passes onto the dwell 63 the upper holder 18 comes in contact with the lower one 24 and unites the overlapping cemented edge portions of the upper and lower ball sections, except at the points where the sections are kept slightly spaced by the venting and centering devices 39. In the further movement of the roller 59 across the dwell 63 the venting devices 39 remain stationary as far as axial movement is concerned, but the holder 18 in its continued downward movement carries the holder 24 and associated parts with it against the pressure of the spring 26, the sleeves 43 sliding on the rods 44 at this time. Downward movement of the lower portion of the lower ball section 67 is prevented, however, as this portion rests upon the stationary head or collapsing device 32, and as a result of the continued downward movement of the remainder of the ball the lower ball section is collapsed within the upper one substantially as shown in Fig. 3. Shortly after the parts have reached a position about as shown in Fig. 3 the cam roller 59 passes off the dwell 63, the dog 58 rocks on its pivot, and the pressure of the spring 56 causes the venting devices 39 to be withdrawn from the ball. During the remaining downward movement of the parts the ball is still further collapsed, until the holder 24 reaches the stop shoulder 27. As a result the collapsed portion of the wall of the lower section is pressed firmly against the overlapping joint between the two sections to thoroughly compact and unite the meeting edge portions of the sections. The operator maintains the foot lever 16 in its extreme lower position for a short interval in order to allow the pressure to close up the spaces formed by the withdrawal of the venting devices 39. It will be seen by an inspection of Fig. 3 that the pressure at the joint during this operation is exerted in a direction practically normal to the plane of the joint, thereby ensuring a thorough union of the sections at all points. The operator then releases the lever 16 and the parts are moved back to their original positions. The pressure of the detent 20 on the metal part of shank 70 is so slight that when the holder 18 is moved upwardly again the united ball tends to drop out of the holder 18. However, if for any reason, such as a slight suction, the united ball should remain in the holder 18, the operator by pressing down on the fingers 22 will move the ejecting plunger 21 to throw out the ball. Should the ball tend to stick to the head 32 through suction the duct 34 will allow the entrance of air beneath the ball and obviate the difficulty. The vertical and horizontal grooves 30 in the seat 28 also allow entrance of air beneath the ball and prevent sticking by reason of suction. The collapsed ball is then placed in a final curing mold and as soon as the vulcanizing heat is applied the volatilization of the pill 71 causes the ball to assume its normal shape and presses the ball against the mold in the usual manner during the vulcanizing operation. After vulcanization the ball is provided with the usual opening 72 in the bottom.

The centering and venting devices or needles 39 may be made hollow, if desired, but in practice it has been found that the needles will separate the two ball sections sufficiently to allow escape or venting of the air in the ball while it is being collapsed. In the present embodiment three such venting needles have been shown, but it is evident that the number may be varied, if desired, and it had been found in practice that one of them is sufficient to vent the ball but in this case, however, the needle cannot, of course, be used for centering the lower section in its holder. It is obvious that the invention is not limited in its application to the specific form of tank ball shown, and that by varying the shape of the holders various styles of tank balls, tennis balls, etc., may be united in accordance with the process. In the making of other articles than tank balls, such as ordinary playing balls, the reinforcing ring 69 will, of course, be dispensed with, and if desired the sections may also be fully cured before joining, and self-curing cement used in joining the sections. In the present tank ball embodiment the reinforcing ring 69 has been shown as disposed at the joint, for convenience in assembling. It may, however, be enclosed in either section, as by molding or otherwise, prior to the joining operation, the only essential being that it be disposed sufficiently near the equatorial portion of the finished ball to prevent distortion at that point when in use. When making balls or articles other than tank balls, a small rubber stem may be formed at the top of the upper section for engagement by the detent 20 of the upper holder 18 during the section joining operation, which stem may be later cut off, or the upper section may be retained in the holder in any other suitable manner. In Fig. 5 is shown a playing or tennis ball having a small segment or section 73 with a stem 74, and a large segment or section 75, the two segments being united by an extended overlapping joint 76. By this construction the ball is balanced at all points and a strong joint provided to withstand the severe usage to which the ball is subjected.

It will be seen that by my invention a ball has been produced in which the sections are of the same rubber stock cured to the same extent, and that the sections are joined on a relatively extended area under a relatively heavy pressure normal to the joint, thereby producing a ball which is practically proof against separation at the joint when in use. Moreover, in the tank ball, the reinforcing ring 69 provides a means for preventing distortion of the equatorial portion of the ball when in use, and its form is such that the reinforcement can be cheaply and easily applied and is wholly enclosed within the material of the wall of the ball, thereby preventing any corrosion due to the action of the water and obviating the necessity of any securing means for the ring. It will also be seen that by my invention the ball is formed entirely of the same rubber stock, thereby reducing the materials, the number of operations, and the equipment required for manufacturing the ball.

Having thus described my invention, what I claim and desire to protect by Letters Patent is:

1. In a machine for uniting the sections of hollow articles of vulcanizable material, means for joining the sections, and means coacting therewith to collapse one section under pressure against the joint to thereby compact the latter.

2. In a machine for uniting the sections of hollow articles of vulcanizable material, means for joining the sections and collapsing one section against the joint under pressure, and means for venting the article while collapsing said section.

3. In a machine for uniting the sections of hollow articles of vulcanizable material, means for joining the sections, means coacting therewith to collapse one section under pressure against the joint to thereby compact the latter, and means for venting the article while collapsing said section.

4. In a machine for uniting the sections of hollow articles of vulcanizable material, relatively movable means for supporting and joining the sections, and means relatively movable with respect to said first means for collapsing one section against the joint to thereby firmly unite the sections at all parts of the joint.

5. In a machine for joining the sections of hollow articles of vulcanizable material, opposed means for holding the sections in alignment, means for relatively moving said first means to press the sections together at their edge portions and collapse one of them into the other, and means for temporarily maintaining a portion of the edges separated, whereby entrapped air may escape.

6. In a machine for joining the sections of hollow articles of vulcanizable material, means for uniting the sections at their edge portions and collapsing one of them into the other, and means for temporarily maintaining a portion of the edges separated, whereby entrapped air may escape.

7. In a machine for uniting the sections of hollow articles of vulcanizable material, means for joining the sections and collapsing one section against the joint under pressure, and means for inserting a venting means between the sections prior to the collapsing and withdrawing the same prior to its completion.

8. In a machine for joining the sections of hollow articles of vulcanizable material, means for successively joining the edge portions of the sections and collapsing one of them into the other, and means for interposing a venting element between the edge portions before joining them and withdrawing the same prior to the completion of the collapsing movement.

9. In a machine for joining the sections of hollow articles of vulcanizable material, relatively movable means for holding the sections with their meeting edges in alignment, spacing means adapted to be inserted between the sections, and means for successively disposing the spacing means between the sections, joining the meeting edges of the sections, collapsing one section within the other, withdrawing said spacing means, and maintaining pressure on said meeting edges.

10. In a machine for joining the sections of hollow articles of vulcanizable material, means for centering and holding one section, means for loosely holding a second section, means for relatively moving the sections to join them at their edges, and means actuated by said last means for centering said second section prior to the joining of the sections.

11. In a machine for joining the sections of hollow articles of vulcanizable material, means for centering and holding one section, means for loosely holding a second section, means for relatively moving the sections to join them at their edges, normally inoperative centering means disposed adjacent the sections, and means operable by the section joining means for moving said centering means into contact with the edge of the second section to center the same and for withdrawing said centering means after the sections are joined.

12. In a machine for joining the sections of hollow articles of vulcanizable material, movable means for supporting one section, means for supporting a second section with its edge in overlapping alignment with the edge of the first section, said last means including a fixed central part and a movable outer part, and means for successively moving said first supporting means into contact with the outer movable part of the second supporting means and then moving both of them relatively to said fixed part.

13. In a machine for joining the sections of hollow articles of vulcanizable material, means for holding the sections in spaced relation with their edges in position to overlap, means for relatively moving the holding means to join the sections and collapse one section against the joint under pressure, and means for interposing venting means between the sections prior to joining them and withdrawing the venting means prior to completing the collapsing movement.

14. In a machine for joining the sections of hollow articles of vulcanizable material, means for holding and centering one section, means for loosely receiving a second section, means for relatively moving said first two means to join the sections and collapse one section against the joint under pressure, and means for interposing a venting means between the sections in position to center the second section prior to joining the sections and for withdrawing said venting means prior to the completion of the collapsing movement.

15. In a machine for uniting the sections of hollow articles of vulcanizable material, a movable holder for one section, a movable holder for the other section, a collapsing device, and means for first relatively moving the holders to bring them into contact and join the sections and then relatively moving the holders and collapsing device to collapse the wall of the article against the joint under pressure.

16. In a machine for uniting the sections of hollow articles of vulcanizable material, a movable holder for centering one section, a movable holder for loosely retaining a second section, a collapsing device, actuating means for first relatively moving the holders to bring them into contact and join the edge portions of the sections and then relatively moving the holders and collapsing device to collapse the wall of the article against the joint under pressure, and a series of venting devices first movable by said actuating means across the edge of said second section to center the same prior to joining the sections and then movable to inoperative position prior to the completion of the collapsing movement.

17. In a machine for uniting the sections of hollow articles of vulcanizable material, means for joining the edge portions of the sections including spaced holders for the sections, a series of venting and centering devices adjacent one of the holders, means for moving said devices across the edge portion of one section, means for moving said devices into contact with the edge portion during said first movement, means for moving the holders to join the sections, means for collapsing one section against the joint under pressure, and means for withdrawing said devices prior to the completion of the collapsing movement.

18. The process of making hollow balls and similar articles of vulcanizable material which consists in forming complementary sections with overlapping wall portions, cementing and bringing together the overlapping portions, and firmly uniting said portions by pressure on both sides thereof and substantially normal to the joint.

19. The process of making hollow balls and similar articles of vulcanizable material which consists in forming complementary sections of the same stock, partly curing them to the same degree, joining them on a long overlapping joint with cement and under pressure substantially normal to the joint, and finally curing the article.

20. The process of making hollow rubber balls and similar articles which comprises forming small and large segments with tapered and extended joining edges, uniting the segments by cementing and overlapping the edges under pressure, and finishing the ball.

21. The process of making hollow rubber balls and similar articles which comprises forming small and large segments with tapered and extended joining edges, cementing the edges, joining the segments by overlapping the edge of the small segment on that of the large one and pressing them together, and finishing the ball.

22. The process of making hollow balls and similar articles of vulcanizable material which consists in forming complementary sections with overlapping wall portions, partially curing the same, cementing and bringing together the overlapping portions and joining them by mechanical pressure on the inner and outer sides of the wall at the joint, and finally curing.

23. The process of making hollow balls and similar articles of vulcanizable material which consists in forming complementary sections of the same stock and provided with wall portions adapted to overlap, partially curing the sections to the same extent, joining the overlapping portions by cement and under pressure on each side of the wall substantially normal to the joint, and finally curing.

24. The process of making hollow balls and similar articles of vulcanizable material which consists in forming complementary sections with overlapping wall portions, partially curing the same, cementing and bringing together the overlapping portions, withdrawing air by collapsing one section within the other over the overlapped portions, compacting the joint by direct pressure on one side thereof and indirect pressure through the collapsed section wall on the other side, and curing.

25. The process of making hollow balls and similar articles of vulcanizable material which consists in forming two complementary sections with wall portions adapted to overlap, cementing and bringing together the overlapping portions, collapsing one section into the other and firmly uniting said portions by pressure while venting the article at a point in the joint, continuing said pressure throughout the joint after venting, and subsequently expanding the article to its normal form again.

26. The process of making hollow balls and similar articles of vulcanizable material which consists in forming complementary sections with overlapping wall portions, cementing and bringing together the overlapping portions, temporarily maintaining a small area of said portions spaced apart while collapsing one section into the other and over said portions, pressing said portions firmly together at all points, and subsequently expanding the article to its normal form again.

27. The process of making tank balls which comprises forming two ball sections of the same vulcanizable stock and with extended complementary joining surfaces, partially curing the sections to the same extent, cementing their joining surfaces, disposing a reinforcing ring adjacent one of said surfaces, joining the sections along said surfaces under pressure and curing the ball.

28. The process of making tank balls which comprises forming a seating section and a supporting section of vulcanizable stock and with overlapping joining portions, cementing and bringing together said joining portions with the interposition of a reinforcing ring, firmly uniting said portions by pressure substantially normal to the joint, and finishing the ball.

29. The process of making tank balls which comprises forming a seating section and a supporting section of the same vulcanizable stock and with overlapping joining portions, partly curing the sections to the same extent, cementing and bringing together said joining portions with the interposition of a reinforcing ring, firmly uniting said portions by pressure, and curing and finishing the ball.

30. The process of making tank balls which comprises forming a seating section and a supporting section of the same vulcanizable stock and with overlapping joining portions, partly curing the sections to the same extent, cementing and bringing together said joining portions with the interposition of a reinforcing ring, collapsing said seating section into the other while venting the ball between said joining portions, firmly uniting said portions at all points by pressing said collapsed section against said overlapping portions, expanding and curing the ball, and finishing it.

31. A hollow rubber ball comprising small and large segments united by an extended overlapping joint.

32. A hollow rubber ball comprising small and large segments of the same soft stock cured to the same degree and united by an extended overlapping joint, the smaller segment overlapping the large one.

33. A tank ball having seating and supporting portions of the same vulcanizable stock and united by a relatively long overlapping joint, and a reinforcing ring imbedded in the wall of the ball adjacent the joint.

34. A tank ball having a lower rounded seating section of soft cured stock provided with an upwardly and inwardly inclined extension, an upper section of the same stock overlapping said extension and integrally united thereto by vulcanization, and a reinforcing ring imbedded in the wall of the ball.

35. A tank ball having a lower rounded seating section of soft cured stock provided adjacent its equatorial portion with a relatively long inwardly and upwardly inclined extension, an upper thickened section of the same stock provided with a tapered lower portion overlapping and integrally united by vulcanization to said extension, and a metallic reinforcing ring imbedded in the overlapping portions of the wall of the ball.

Signed at Passaic, county of Passaic, and State of New Jersey, this 27 day of April, 1922.

HENRY Z. COBB.